United States Patent
Porter et al.

(10) Patent No.: US 6,875,924 B2
(45) Date of Patent: Apr. 5, 2005

(54) EXTENDIBLE FLEXIBLE ELECTRICAL CONDUIT WITH CONDUCTORS THEREIN

(75) Inventors: Douglas S. Porter, Simsbury, CT (US); Philip B. Porter, Southbury, CT (US)

(73) Assignee: Uniprise International, Inc., Terryville, CT (US)

( * ) Notice: Subject to any disclaimer, the term of this patent is extended or adjusted under 35 U.S.C. 154(b) by 24 days.

(21) Appl. No.: 10/658,509

(22) Filed: Sep. 9, 2003

(65) Prior Publication Data

US 2005/0051350 A1 Mar. 10, 2005

(51) Int. Cl.[7] .................................................. H02G 3/00
(52) U.S. Cl. ..................... 174/69; 174/70 R; 174/75 R; 174/75 D; 174/75 F
(58) Field of Search ................................ 174/69, 70 R, 174/75 R, 75 D, 75 F

(56) References Cited

U.S. PATENT DOCUMENTS

| | | | |
|---|---|---|---|
| 2,209,912 A | 7/1940 | Deems | |
| 2,488,480 A | 11/1949 | Spirt | |
| 2,520,497 A | 8/1950 | Finke | |
| 2,550,423 A | 4/1951 | Nelson | |
| 3,026,409 A | 3/1962 | Deisch | |
| 3,324,254 A | 6/1967 | Shaw et al. | |
| 4,989,295 A | * 2/1991 | Guhne et al. | ............... 15/410 |
| 5,065,299 A | 11/1991 | Cohen | |
| 5,176,438 A | * 1/1993 | Fisherman | ............... 362/99 |
| 5,874,709 A | * 2/1999 | New et al. | ............ 219/137.9 |
| 5,933,557 A | * 8/1999 | Ott | ............... 385/86 |
| 6,448,494 B1 | * 9/2002 | Erlich et al. | ............... 174/46 |

* cited by examiner

Primary Examiner—Chau N. Nguyen
Assistant Examiner—Jinhee Lee
(74) Attorney, Agent, or Firm—McCormick, Paulding & Huber LLP

(57) ABSTRACT

An extendible flexible electrical conduit with a telescoping section connected between two spiral gooseneck sections and having insulated electrical conductors extending through the conduit. The conductors are helically wound inside the inner tube of the telescoping section so as to allow them to extend and contract to accommodate extension and contraction of the telescoping section. The outer tube of the telescoping section is oval along most of its length and the sliding end of the inner tube is also oval. The length of the telescoping section may be locked by rotating the inner tube with respect to the outer tube.

15 Claims, 2 Drawing Sheets

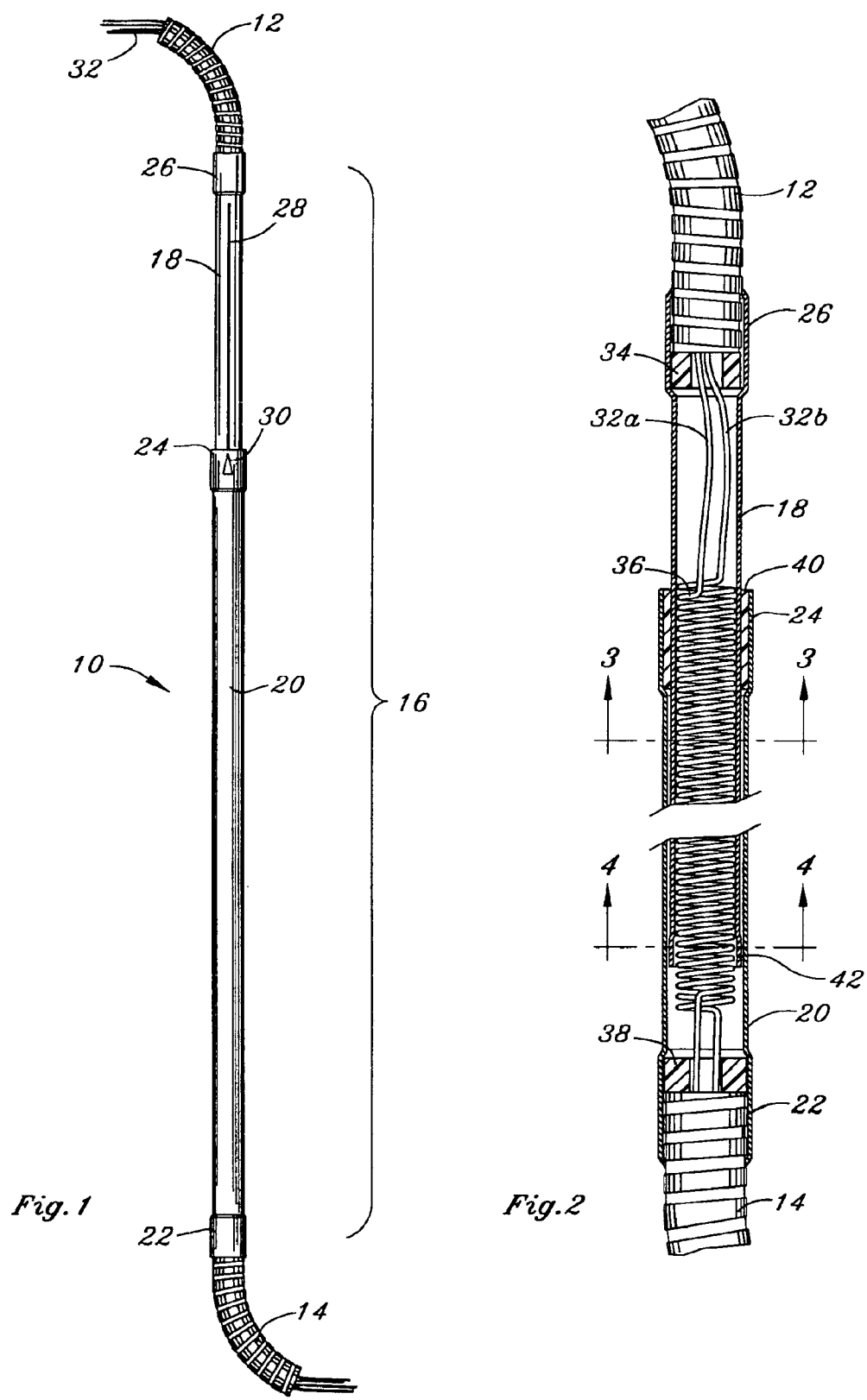

EXTENDIBLE FLEXIBLE ELECTRICAL CONDUIT WITH CONDUCTORS THEREIN

BACKGROUND OF THE INVENTION

Figure 3:
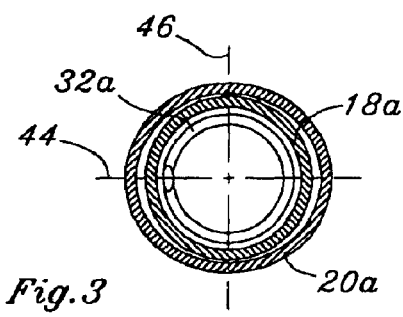

Flexible spiral wound conduits are well known for carrying and protecting electrical conductors, sometimes referred to as "goosenecks". Such flexible conduits have recently become miniaturized and used to carry internal wiring for communications purposes such as microphone holders. Also well known are telescoping coaxially sliding tubes used as conduits to extend or contract the conduit. These are used with swivel table lamps and also to hold microphones. Each of these two different types of conduits has utility for specific applications. For example, spiral wound flexible casings may be bent universally in different directions and hold the bent position, but are non-extendible. On the other hand, telescoping tubes will extend and contract in a single direction, but are not bendable or flexible, and require universal joints or pivots at their ends to change their orientation.

U.S. Pat. No. 5,065,299 issued Nov. 12, 1991 to Cohen discloses a power extendible lamp, wherein short telescopic sections of non-circular cross section appear to give limited flexibility to a lamp holder. Limited curvature is apparently achieved by utilizing many very short telescopic sections.

U.S. Pat. No. 3,324,254 issued Jun. 6, 1967 to Shaw et al. discloses a microphone holder with a rigid telescoping section containing microphone wires which collapse into the space between the ends of the telescoping tubes when the unit is contracted. A jam nut is required to hold a desired position, and provision for vibration reduction is also added. A pivot pin and a swivel mounting allow for movement of the microphone in different directions.

U.S. Pat. No. 2,209,912 issued Jul. 30, 1940 to Deems illustrates a telescoping underground protective conduit for armored electrical cable, which is helically wound inside the inner telescoping tube to permit raising the upper end of the assembly.

There is a need for a flexible extendible conduit which will accommodate a number of conductors, which allows full freedom of direction at one or both ends of the conduit as well as the ability to extend and contract in length. All of this should be suitable for ease of manufacture in miniaturized form, so that it could be used for applications such as microphone holders, small lamps and the like. In addition, it would be desirable to lock the telescoping section in a desired place without the need for a jam nut which is commonly employed today in microphone holders. Also there is a need for an extendible flexible conduit which reduces vibration or shocks due to impact.

Accordingly, one object of the present invention is to provide an improved extendible flexible electrical conduit with conductors therein.

Another object is to provide such an extendible flexible electrical conduit with means to lock the extendible section in place.

Another object is to provide such an extendible flexible electrical conduit which reduces shocks and vibration along the conduit.

SUMMARY OF THE INVENTION

Briefly stated, the invention comprises an extendible flexible electrical conduit with conductors therein comprising at least one spiral wound flexible casing, a rigid telescoping section connected thereto and having insulated electrical conductors extending through the conduit. The conductors are arranged inside the telescoping section, preferably by bunching up or helically winding the conductors so as to allow them to extend and contract to accommodate extension and contraction of the telescoping section. The telescoping section comprises inner and outer tubes that are slidably and coaxially disposed to allow the telescoping section to extend and contract. In order to limit rotation of the inner tube with respect to the outer tube, the outer tube is preferably oval along most of its length and the sliding end of the inner tube is also oval. By rotating the inner tube with respect to the outer tube, the length of the telescoping section may be locked without the use of a jam nut. Preferably there are spiral wound flexible casings on either end of the telescoping section.

DRAWING

Figure 4:
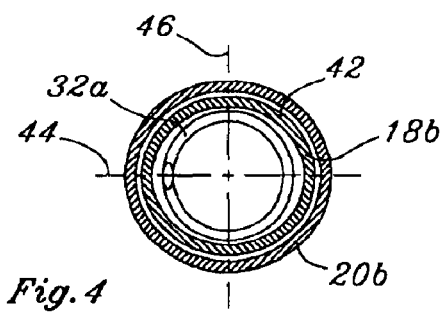
Figure 5:
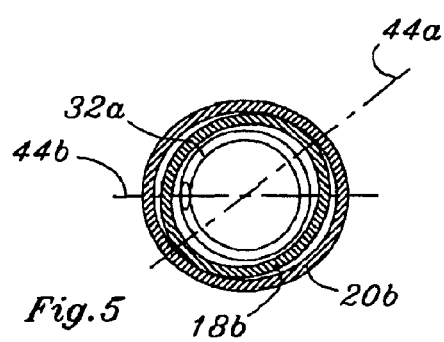
Figure 6:
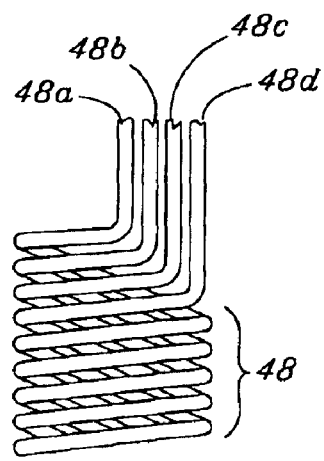
Figure 7:
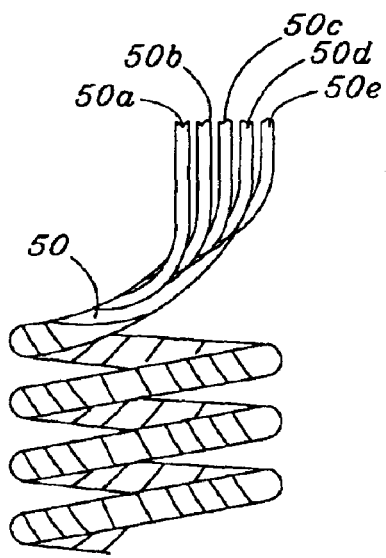

The invention will be better understood by reference to the following description, taken in connection with the accompanying drawings, in which:

FIG. 1 is an elevation view of the extendible flexible electrical conduit in accordance with the present invention, FIG. 2 is a partial view in cross section, illustrating the construction at the interfaces of the telescoping middle section with the flexible casing sections attached thereto, FIG. 3 is an enlarged plan view in cross section taken along lines III—III of FIG. 2, FIG. 4 is an enlarged plan view in cross section, taken along lines IV—IV of FIG. 2, FIG. 5 is an enlarged plan view in cross section, taken along the same plane as FIG. 4, but with inner and outer tubes rotated with respect to one another, FIG. 6 is an enlarged elevation view of four helically wound conductors interspersed with one another, and FIG. 7 is an enlarged elevation view of five conductors spirally wound into a single multi-strand conductor in the form of a helix.

DETAILED DESCRIPTION OF THE PREFERRED EMBODIMENT

Referring now to FIG. 1 of the drawing, an extendible flexible electrical conduit is shown generally at 10, which comprises a first spiral wound flexible casing 12, a second spiral wound flexible casing 14, and a rigid telescoping middle section 16 connected between flexible casings 12 and 14. The flexible casings 12 and 14 are of a construction well known in the art, consisting of a spirally wound spring with formed metal wire separating the coils of the spring creating friction between spring and formed wire, so that the casing may be bent in any direction and will retain its bent shape as illustrated in the drawing.

The telescoping middle section 16 comprises an inner tube 18 and an outer tube 20. The outer tube 20 has an expanded (swaged) attachment end 22 and an expanded free end 24. The inner tube 18 has an expanded attachment end 26 and a free end (not shown in FIG. 1) that slides in close contact within outer tube 20 so that the middle section 16 can extend and contract.

For reasons later to be explained, the invention may include an indicia line 28 inscribed on the inner tube and a pointer 30 inscribed on the outer tube. A group of insulated electrical conductors 32 extend through flexible casing 12, telescoping middle section 16, and flexible casing 14.

Referring to FIG. 2 of the drawing, portions of the conduit are illustrated in enlarged cross sectional views at the connection between the first (upper) flexible casing 12 and inner tube 18, and also between the second (lower) flexible casing 14 and the outer tube 20.

The arrangement of electrical conductors may take several forms. In FIG. 2, there are two insulated conductors 32a, 32b running through the upper flexible casing 12 and held within a plastic retaining ring 34. Conductors 32a, 32b are interleaved with one another and formed into a helical coil 36, which extends most of the length of the telescoping middle section 16. The conductors are attached to another retaining ring 38, and from there pass through the lower flexible casing 14. Retaining rings 34, 38 are dimensioned to fit tightly within the expanded sections 26, 22 of the inner and outer tubes 18, 20 respectively. A bushing 40 of plastic material is disposed in the expanded section 24 of outer tube 20, to receive the inner tube 18, so that tubes 18, 20 will slide easily within one another.

In accordance with one aspect of the present invention, portions of the inner and outer tubes are made to be non-circular so as to limit rotation about their axes relative to one another. Although the non-circularity may take several forms, the preferred embodiment makes the cross section of the outer tube 20 oval along the major length thereof between attachment end 22 and free end 24. In addition, a relatively short portion of the free end of inner tube 18 (designated by reference number 42 in FIG. 2) is also made oval with the same outline as outer tube 20 but forming close clearance therewith.

Reference to FIGS. 3 and 4 of the drawings illustrate the preferred form of the invention. In FIG. 3, a conductor 32a of helix 36 is seen inside the circular cross section of inner tube designated at 18a. The cross section of the outer tube designated at 20a has a slightly oval or elliptical cross section with major axis 44 and minor axis 46.

Referring to FIG. 4 of the drawings, taken through the free end 42 of the inner tube as shown in FIG. 2, a conductor 32a of the helix 36 is disposed inside free end 42, which is oval or elliptical in cross section as indicated at reference number 18b. The outer tube 20 is also elliptical in cross section as indicated at reference 20b. Both the ellipses of 18b and 20b have the same major axis 44 and minor axis 46. When the major and minor axes 44, 46 are aligned, the inscribed line 28 and pointer 30 (FIG. 1) appear as shown, and the middle telescoping assembly will freely extend and contract while the helix 36 of conductors 32a, 32b will also extend and contract to accommodate the movement.

Reference to FIG. 5 illustrates the same cross section as FIG. 4, but with inner and outer tubes 18, 20 rotated about their longitudinal axis with respect to one another, so that the major axis of elliptical inner tube free end, designated 44a is rotated with respect to the major axis of elliptical outer tube 20b, as indicated at 44b. In this position there is interference between the walls of inner and outer tubes and they will not slide longitudinally with respect to one another. Thus rotation will lock the tubes so that the middle section cannot extend or contract until the indices 28, 30 are again aligned. This is a useful feature for a microphone holder, lamp or other device and obviates the need for a jam nut as in prior art devices.

The arrangement of the conductors inside the telescoping middle section 16 can take several forms without departing from the scope of the present invention. In its simplest form, the conductors may simply be wadded or jumbled up inside the inner tube in a random fashion, or they may be arranged in a zig-zag or helical fashion. The preferred embodiment utilizes a helical arrangement to prevent possibility of entanglement.

FIG. 6 of the drawing shows one arrangement wherein the conductors are separately insulated and interleaved with one another in a helical arrangement. These are shown as conductors 48a, 48b, 48c, 48d which are interleaved into a single interleaved helix 48.

Referring to FIG. 7 of the drawing, individual conductive strands 50a–50e are spirally wound into a single multi-strand conductor 50 which is again shaped as a helix in a preferred form of the invention.

OPERATION

The components are assembled as described and indicated in FIGS. 1 and 2. The free ends of the flexible casings 12, 14 may be attached to the desired components and the conductors 32 connected in a conventional fashion. For example, flexible casing 14 might be connected to a support for a microphone podium, while a microphone would be attached to the free end of casing 12. The spiral construction of the flexible casings serves to dampen and reduce any shocks or vibration between the podium and the microphone.

The telescoping middle section 16 may be extended or contracted to provide the proper length, while the flexible casings 12, 14 are bent manually to conform to a desired shape, which they will retain. The inner tube 18 may then be rotated with respect to outer tube 20 to lock the telescoping mid-section in the desired position. Thus the invention provides an improved functionality and is adaptable to a great many devices requiring an extendible flexible electrical conduit with conductors therein.

While the invention is shown in its preferred form with flexible casings attached on either end of a telescoping middle section, it is within the scope and purview of the present invention to utilize only one such flexible casing to obtain universal bending action in combination with length extension. Thus, a single spiral casing might be used on the lower end to attach to a support, while a lamp or microphone might be attached to the upper end, either with or without a pivot connection. Conversely a pivot or swivel connection could directly connect the telescoping section to a support, and a spiral casing used at the upper end to obtain directional placement of a microphone or lamp.

Other modifications will occur to those skilled in the art, and it is desired to secure in the appended claims all such modifications as fall within the true spirit and scope of the invention.

What is claimed is:

1. An extendible flexible electrical conduit with conductors therein, comprising:

first and second spiral wound flexible casings;

a rigid telescoping middle section connected thereto and communicating therewith; and a plurality of insulated electrical conductors extending through said first and second spiral wound flexible casings and said telescoping middle section, the conductors being disposed in the telescoping middle section so as to allow them to extend and contract to accommodate extension and contraction of said telescoping middle section.

2. The combination according to claim 1, wherein said telescoping middle section comprises an inner and an outer tube, said tubes being slidably and coaxially disposed with respect to one another to permit the telescoping middle section to extend and contract and wherein said electrical conductors are helically disposed in the telescoping middle section.

3. The combination according to claim 2, wherein portions of said inner and outer tubes are non-circular, so as to limit rotation about their axis relative to one another.

4. The combination according to claim 3, wherein the outer tube is oval between its attachment end and its free end, and wherein the free end of the inner tube is oval, whereby the rotation of the inner tube with respect to the outer tube is limited to a preselected amount, while allowing the tubes to move longitudinally with respect to one another.

5. An extendible flexible electrical conduit with conductors therein, comprising:

first and second spiral wound flexible casings;

a rigid telescoping middle section connected between said first and second flexible casings and communicating therewith; and a plurality of insulated electrical conductors extending through the first flexible casing, the telescoping middle section and the second flexible casing, the conductors being disposed in the telescoping middle section so as to allow them to extend and contract to accommodate extension and contraction of said telescoping middle section.

6. The combination according to claim 5, wherein said telescoping middle section comprises an inner and an outer tube, said tubes being slidably and coaxially disposed with respect to one another to permit the telescoping middle section to extend and contract and wherein said electrical conductors are helically disposed in the telescoping middle section.

7. The combination according to claim 6, wherein portions of said inner and outer tubes are non-circular, so as to limit rotation about their axis relative to one another.

8. The combination according to claim 7, wherein the outer tube is oval between its attachment end and its free end, and wherein the free end of the inner tube is oval, whereby the rotation of the inner tube with respect to the outer tube is limited to a preselected amount, while allowing the tubes to move longitudinally with respect to one another.

9. An extendible flexible electrical conduit with conductors therein, comprising a rigid telescoping middle section;

said telescoping middle section having an inner tube with an attachment end and a free end;

said telescoping middle section having an outer tube with an attachment end and a free end;

said inner and outer tubes being slidably and coaxially disposed with respect to one another to permit the telescoping middle section to extend and contract;

a first spiral wound flexible casing attached to and communicating with the outer tube attachment end;

a second spiral wound flexible casing attached to and communicating with the inner tube attachment end; and a plurality of insulated electrical conductors extending through the first flexible casing, the telescoping middle section and the second flexible casing;

the conductors being arranged to allow them to extend and contract to accommodate extension of said telescoping middle section.

10. The combination according to claim 9, and further including a bushing disposed between said free end of the outer tube and said inner tube.

11. The combination according to claim 9, wherein said electrical conductors have a first portion arranged to fit within the first spiral wound flexible casing, a second portion arranged to fit within the second spiral wound flexible casing and a central helically wound portion arranged to expand and contract within the telescoping middle section.

12. The combination according to claim 11, and further including a retaining ring encasing said plurality of conductors on either side of the central helically wound portion, said retaining rings being adapted to fit within the respective attachment ends of the inner and outer tubes to hold said plurality of conductors in place.

13. The combination according to claim 11, wherein said conductors are interleaved along said helically wound portion.

14. The combination according to claim 11, wherein said conductors are disposed within a sheath, said sheath being helically wound along said helically wound portion.

15. The combination according to claim 9, wherein the outer tube is oval between its attachment end and its free end, and wherein the free end of the inner tube is oval, whereby the rotation of the inner tube with respect to the outer tube is limited to a preselected amount, while allowing the tubes to move longitudinally with respect to one another.

* * * * *